US009060328B2

(12) United States Patent
Marinier et al.

(10) Patent No.: US 9,060,328 B2
(45) Date of Patent: Jun. 16, 2015

(54) METHOD AND APPARATUS FOR SMALL CELL DISCOVERY IN HETEROGENEOUS NETWORKS

(75) Inventors: Paul Marinier, Brossard (CA); Samian Kaur, Plymouth Meeting, PA (US); Diana Pani, Montreal (CA); Christopher Cave, Dollard-des-Ormeaux (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 136 days.

(21) Appl. No.: 13/446,671

(22) Filed: Apr. 13, 2012

(65) Prior Publication Data
US 2012/0263145 A1    Oct. 18, 2012

Related U.S. Application Data

(60) Provisional application No. 61/475,063, filed on Apr. 13, 2011, provisional application No. 61/480,768, filed on Apr. 29, 2011.

(51) Int. Cl.
*H04W 4/00*    (2009.01)
*H04W 48/08*    (2009.01)
*H04W 36/22*    (2009.01)
*H04W 84/04*    (2009.01)

(52) U.S. Cl.
CPC .............. *H04W 48/08* (2013.01); *H04W 36/22* (2013.01); *H04W 84/045* (2013.01)

(58) Field of Classification Search
CPC ............................. H04W 36/00; H04W 36/04
USPC .......................................................... 370/331
See application file for complete search history.

(56) References Cited

U.S. PATENT DOCUMENTS

2007/0082675 A1*   4/2007   Gruet et al. ................... 455/453
2009/0005029 A1*   1/2009   Wang et al. ................... 455/423
(Continued)

FOREIGN PATENT DOCUMENTS

WO   WO-2009/058068 A1   5/2009
WO   WO-2010/126344 A2   11/2010
WO   WO-2011/002370 A1   1/2011

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 10)", 3GPP TS 36.300 V10.3.0, Mar. 2011, 197 pages.

(Continued)

*Primary Examiner* — Shripal Khajuria
(74) *Attorney, Agent, or Firm* — Theodore Naccarella

(57) ABSTRACT

A method for acquiring and applying offload area information for offloading a wireless transmit/receive unit (WTRU) to a small cell in a different frequency layer is disclosed. The WTRU may enter a region or a macro cell and receive offload area information of the region in which a small cell in the vicinity of the macro cell is located. The offload information may be received in a system information block (SIB), dedicated signaling, or any other radio signal. The WTRU may perform measurements to determine the location of the WTRU and to determine whether it has entered any offload areas. Upon a determination that the offload area information is no longer valid, the WTRU may delete the offload area information.

21 Claims, 4 Drawing Sheets

(56) References Cited

U.S. PATENT DOCUMENTS

2010/0048217 A1 2/2010 Deshpande et al.
2012/0040669 A1* 2/2012 Boley et al. ............... 455/435.1

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 10)", 3GPP Draft; 36.331 CR0XXX (Rel-10) R2-112224 on Miscellaneous Corrections, 3rd Generation Partnership Project (3GPP), Mobile Competence Center; 650, Route Des Lucioles, F-06921 Sophia-Antipolis Cedex; France, vol. RAN WG2, No. Shanghai, China, Apr. 5, 2011, 294 pages.

"3rd Generation Partnership Project; Technical Specification Group Radio Access Network; Evolved Universal Terrestrial Radio Access (E-UTRA); User Equipment (UE) procedures in idle mode (Release 10)", 3GPP TS 36.304 V10.1.0, Mar. 2011, 33 pages.
"International Search Report and Written Opinion", dated Jul. 27, 2012, International Application No. PCT/US2012/033559, 17 pages.
Catt, "Clarification on HetNet Mobility Improvements Study Item", 3GPP TSG RAN WG2 Meeting #73bis, R2-111831, Shanghai, China, Apr. 11-15, 2011, 2 pages.
ZTE, "Initial consideration on Hetnet mobility enhancements", 3GPP TSG RAN WG2 #73bis R2-111915, Shanghai, China, Apr. 11-15, 2011, 4 pages.
Nokia et al., "Discussion of HetNet Mobility Topics for Rel-11", 3GPP TSG-RAN WG2 Meeting#73bis, R2-112334, Shanghai, China, Apr. 11-15, 2011, 4 pages.

* cited by examiner

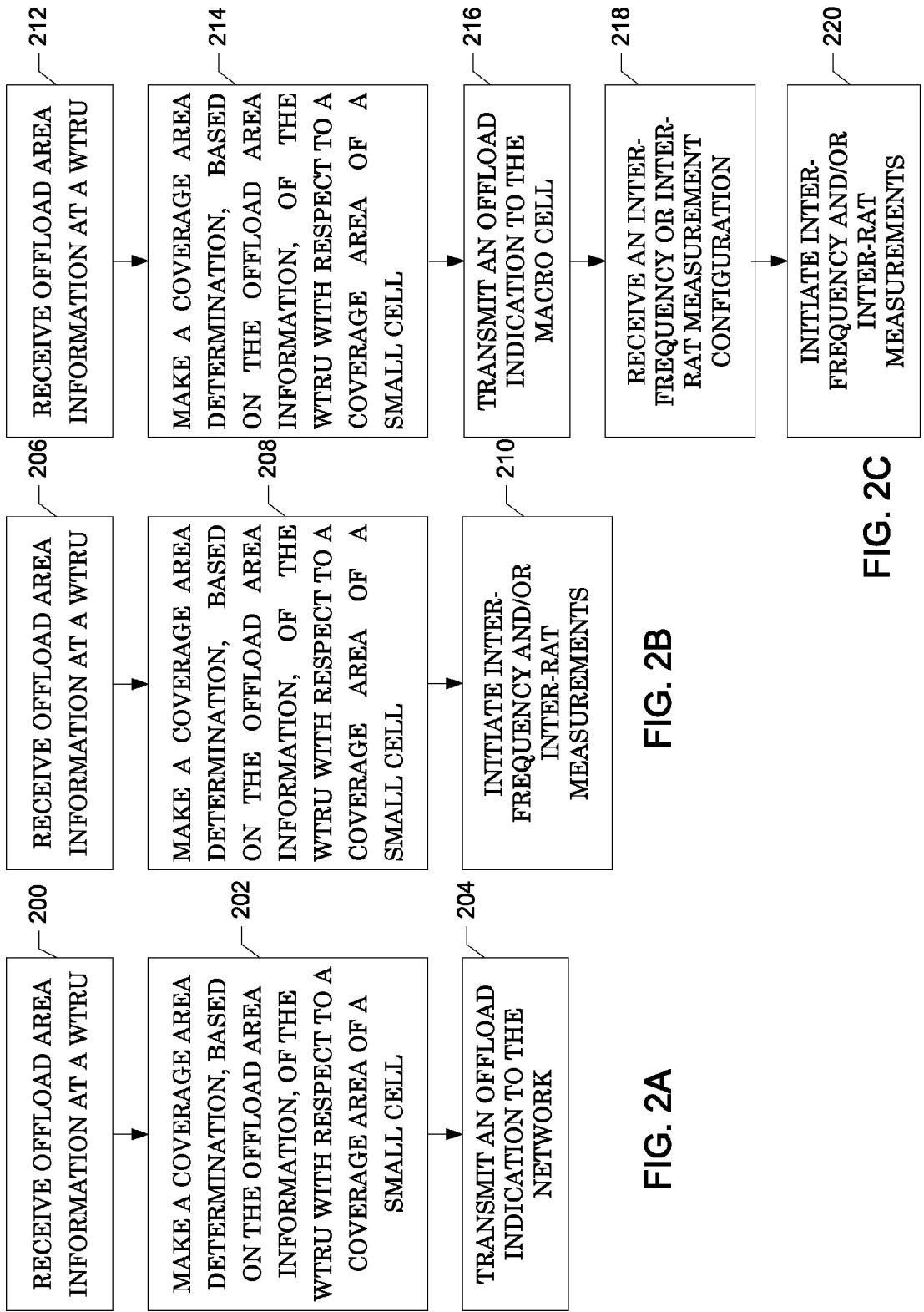

METHOD AND APPARATUS FOR SMALL CELL DISCOVERY IN HETEROGENEOUS NETWORKS

CROSS REFERENCE TO RELATED APPLICATIONS

This application claims priority to U.S. Provisional Patent Application Ser. No. 61/475,063 filed Apr. 13, 2011, entitled "Method for Small Cell Discovery In Heterogeneous Networks" and to U.S. Provisional Patent Application Ser. No. 61/480,768 filed Apr. 29, 2011, entitled "Method and Apparatus for Small Cell Discovery In Heterogeneous Networks", both of which are incorporated herein by reference.

BACKGROUND

The autonomous search and proximity indication functions facilitate inbound mobility of a Wireless Transmit-Receive Unit (WTRU) to a Closed Subscriber Group (CSG) or hybrid cell of which it is a member, in idle mode and connected mode.

Both functions may implicitly rely on the existence of a "fingerprint" that allows the WTRU to infer the potential presence of a CSG or hybrid cell of which it is a member, even if such cell is operating in a frequency on which the WTRU is not measuring. Fingerprint information may include information and/or measurements used by the WTRU to determine whether it is in the vicinity of certain cells or group of cells. Positioning functionality, supported in wireless communication standards such as long term evolution (LTE), provides a means to determine the geographical position and/or velocity of the WTRU based on measuring radio signals.

SUMMARY

A method for acquiring and applying offload area information for offloading a wireless transmit/receive unit (WTRU) to a small cell in a different frequency layer is disclosed. The WTRU may enter a region or a macro cell and receive offload area information of the region in which a small cell in the vicinity of the macro cell is located. The offload area information may include at least one of a global positioning system (GPS) coordinate, a radius over which the area extends with respect to the GPS coordinate, a list of position reference signals (PRS), a cell identity or a list of cell identities, a frequency on which the small cell is located, and a radio access technology (RAT) of the corresponding cell. The offload information may be received in a system information block (SIB), dedicated signaling, or any other radio signal. The WTRU may perform measurements to determine the location of the WTRU and to determine whether it has entered any offload areas. Upon a determination that the offload area information is no longer valid, the WTRU may delete the offload area information.

BRIEF DESCRIPTION OF THE DRAWINGS

A more detailed understanding may be had from the following description, given by way of example in conjunction with the accompanying drawings wherein:

FIGS. 2A-2C are flow diagrams of example methods for small cell discovery in heterogeneous networks.

DETAILED DESCRIPTION

Figure 1A:
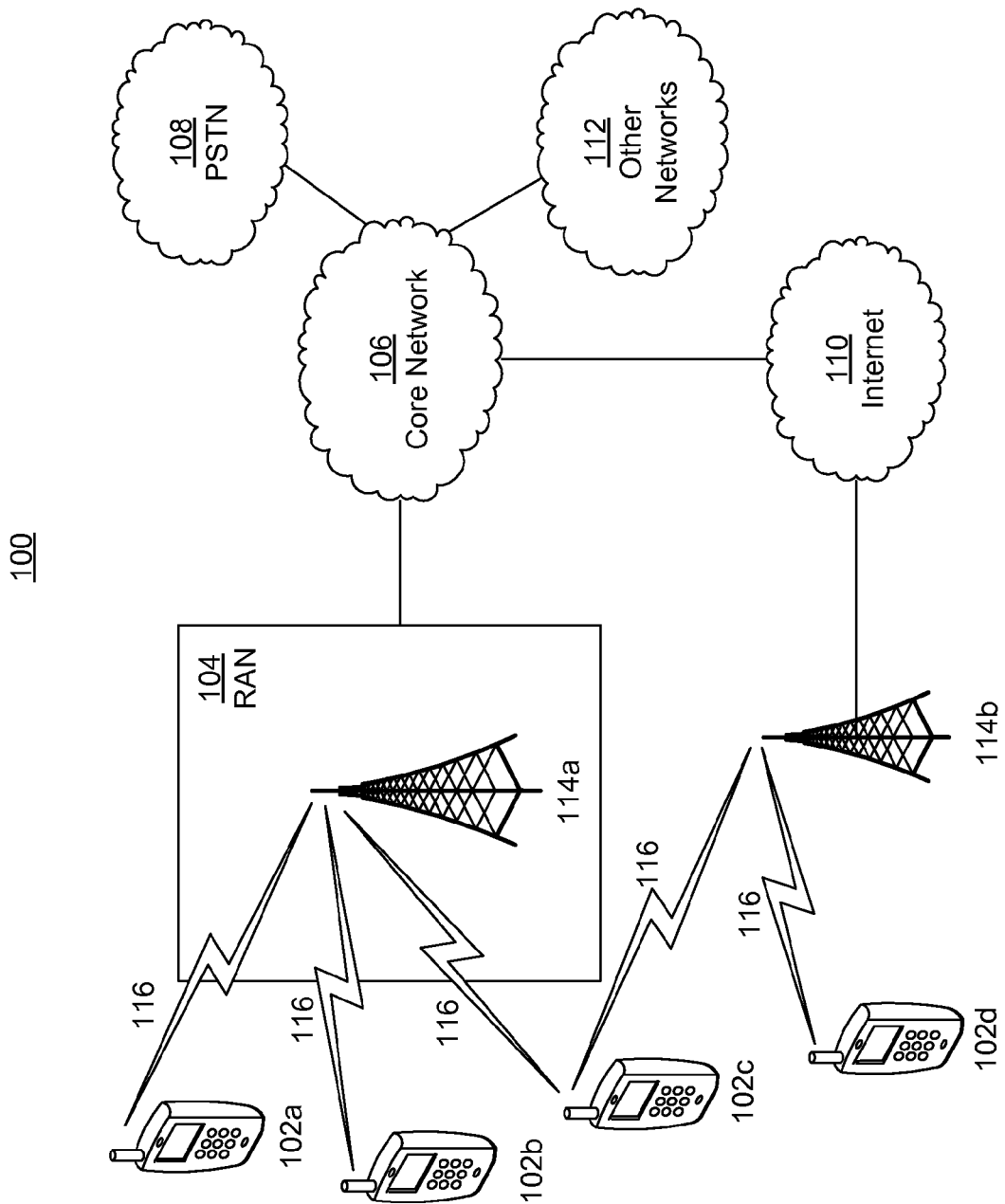
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
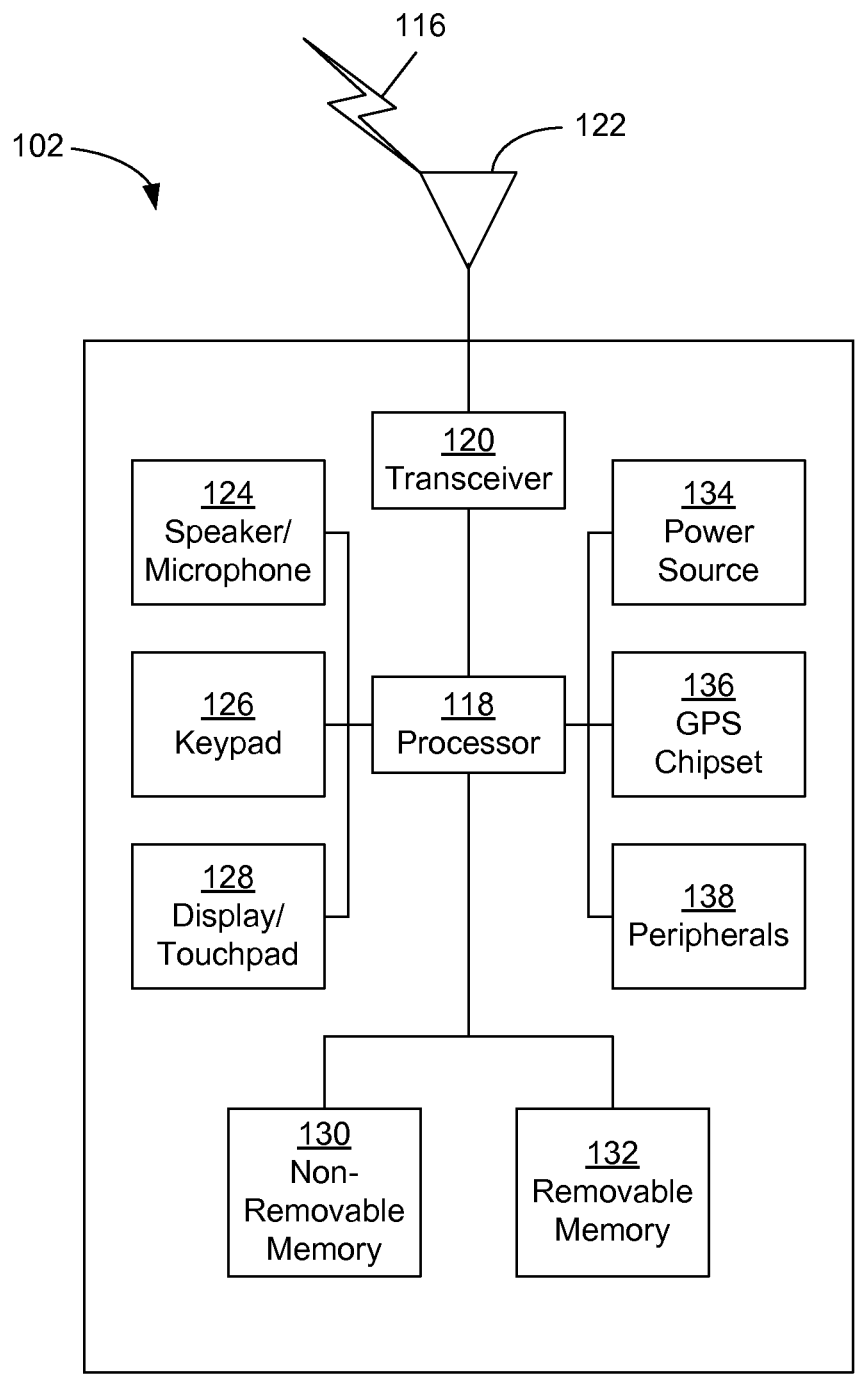
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
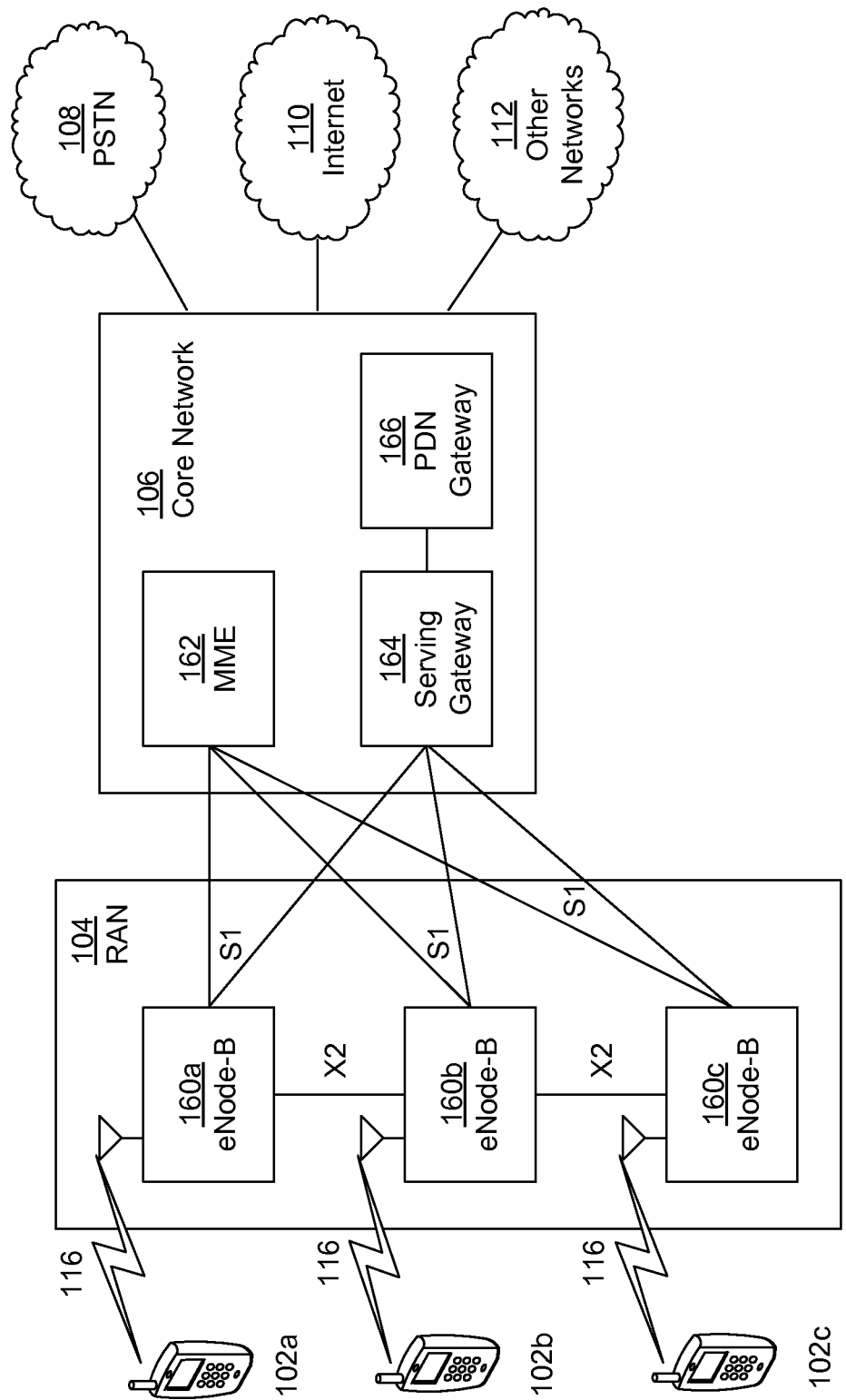
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs may be associated with a particular cell (not shown) and may be configured to handle radio resource management decisions, handover decisions, scheduling of users in the uplink and/or downlink, and the like. As shown in FIG. 1C, the eNode-Bs may communicate with one another over an X2 interface.

The core network 106 shown in FIG. 1C may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 142 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs in the RAN 104 via the S1 interface. The serving gateway 164 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

LTE positioning protocol (LPP) is used point-to-point between a location server, such as an evolved serving mobility location server (E-SMLC) or secure user plane for location (SUPL) location platform (SLP) and a target device, such as SUPL enabled terminal (SET), or WTRU, to position the target device using position-related measurements obtained by one or more reference sources. An LPP session is used between a location server and the target device to obtain location related measurements or a location estimate or to transfer assistance data. The LPP session may be initiated by either the WTRU, eNB or the E-SMLC. In case of eNB initiated positioning, the eNB sends a Location Service Request to the MME, who then forwards it to the E-SMLC. The E-SMLC processes the location services request which may include transferring assistance data to the target WTRU to assist with WTRU-based and/or WTRU-assisted positioning and/or may include positioning of the target WTRU. The E-SMLC then returns the result of the location service back to the MME (e.g., a position estimate for the WTRU and/or an indication of any assistance data transferred to the WTRU). In the case of a location service requested by an entity other than the MME (such as, the eNB); the MME returns the location service result to the eNB.

Positioning reference signals (PRS) have been added in the downlink physical transmission to assist in WTRU-based observed time difference of arrival (OTDOA) position estimations. PRSs are transmitted in resource blocks in configured downlink subframes, with the resource mapping offset by the Physical cell identity (PCI) of the cell.

System capacity may be maximized by offloading traffic from the macro cells to the small cells. A "small cell" may refer to a cell whose coverage area is usually of limited size, and to which the WTRU has access, such as (but not limited to) an open cell or a hybrid cell.

When a macro layer is deployed on another frequency than a small-cell layer, a WTRU operating on the macro layer in a battery-efficient way (in idle or connected mode) may take inter-frequency measurements when the quality or signal strength of its serving cell becomes low. Therefore, offloading to small cells deployed in areas where the serving cell is sufficiently strong may not occur. One exception may be when the small cell is a CSG or hybrid cell of which the WTRU is a member, in which case the WTRU may detect the need for inter-frequency measurements using autonomous search and send a proximity indication to the network if in connected mode.

Methods allowing offloading to small cells in a different frequency layer, while not compromising the battery consumption of the WTRU, are described in greater detail hereafter. The methods described herein may also be applicable to small cells in same frequency or to small cells in a different radio access technology (RAT). The small cells may be for example, LTE, UMTS, GERAN, or 802.11 cells.

Methods to enable the acquisition and storing of information for the detection of small cells are disclosed herein.

Methods are described to enable the WTRU to acquire and store information on at least one location of at least one small cell where the WTRU may be offloaded. Such information for a specific location may be referred to as "offload area information" in the following examples.

The Offload Area Information may comprise but is not limited to one or a combination of the following: at least one Offload Area that may include at least one small cell, which may be at least one of: an area provided by center point (defined e.g. by GPS coordinates) and a radius; set of GPS coordinates; an area defined by a number of GPS coordinates (e.g. X coordinates define the limits of the region in which small cells are available); the coverage area of at least one macro cell, along with the identity of this at least one macro cell (PCI, CGI); the intersection of at least two of the above. Other examples of Offload Area information may include: a list of Reference any reference signal (e.g. Position Reference Symbols (PRS), CSI-RS, CRS; a PCI or a list of PCIs; Cell Identity or a list of Cell Identities; a frequency in which the cells are located; the RAT of the corresponding cells; or an area under a certain macro cell, defined by any of the location information described above; the speed of the WTRU as determined by any of the well-known positioning methods described above The WTRU may subsequently use the stored offload area information for the at least one location to perform at least one of the following, as described in more detail herein below: in idle mode, initiate inter-frequency or inter-RAT measurements, enabling potential cell reselection to a small cell included in the offload area; or in connected mode, transmit an offload indication to enable the network to provide appropriate updated configuration at a proper time, as appropriate to enable potential handover to a small cell included in the offload area; for example an inter-frequency or inter-RAT or intra-frequency measurement configuration, DRX configuration, or mobility state estimation configuration.

Methods of transmission of Offload Indication to the RAN are herein disclosed. In this embodiment, the WTRU may send an "offload indication" to the RAN to indicate that it is entering or leaving the vicinity of one or multiple neighboring cells (e.g. pico cell operating on another frequency or RAT) and that it may be configured with inter-frequency or inter-RAT measurements for potential handover to one of these cells (for offload purposes), or in case of leaving indication the measurement configuration on a different frequency or a RAT may be removed.

A WTRU moving above a certain speed through the macro layer may not be a good candidate for offloading to the small cell layer. In this case the network may use the WTRU speed information to assist in determining if offload is required or not.

The "offload indication" message may include any of the following information elements. The IE's include but are not limited to: a new RRC message, "Offload Indication", to indicate that the WTRU is a candidate for traffic offload. The existing "Proximity Indication" RRC message that may be used for indicating to the RAN that a WTRU is in the vicinity of a CSG cell to which it potentially has access. The existing "Proximity Indication" RRC message may be modified to include additional information elements that may be used for offload purposes and to indicate that the reason for transmitting the indication is for offload purposes. Or an existing RRC Measurement Report message may be modified to include additional information elements that may be used for offload purposes. In a further embodiment, a new measurement type "Offload indication" maybe introduced and reported in a RRC measurement report. Further still, the "proximity indication" measurement type may be extended to provide offload information and to explicitly indicate to the network that the proximity is due to offloading rather than a CSG or both.

The offload indication message may also include at least one of the following information elements: an indication whether the WTRU is entering the offload area or leaving the offload area; the offload area to which the WTRU may be offloaded, which may be indicated by an identifier or an index, or an offload area tag; the frequency on which the WTRU may be offloaded; the cell ID of the potential target cell(s) to which the WTRU may be offloaded; the PCI of the potential target cell(s) to which the WTRU may be offloaded;

the radio access technology to which the WTRU may be offloaded; the area in which the WTRU is located (e.g. a GPS coordinate(s) or other location based information may be provided); the WTRU mobility state information. Additionally, the radio access technology of the cell may be indicated (e.g LTE, UMTS, 802.11, etc). For a 802.11 cell the WTRU may further provide additional information, such as channel, SSID, MAC address, etc.

The transmission of the offload indication may be triggered when the WTRU determines that it has entered an offload area. The determination that the WTRU has entered an offload area may be made by comparing its position to the stored offload area information or the offload area information that is provided by the RAN.

The transmission of the offload indication may be triggered when the WTRU determines that it has left an offload area. The determination that the WTRU has left an offload area may be made by comparing its position to the stored offload area information or the offload area information that is provided by the RAN.

For the conditions described above, the WTRU may determine its current position using any well-known positioning technique, such as but not limited to: GPS coordinate estimation; LTE positioning method (e.g. use of PRS transmitted from multiple transmission points to estimate its position); or any other positioning method.

Furthermore, it is understood that the UE may determine its current positions based on detected neighboring cells or neighboring cells that have a channel measurement above a threshold.

The conditions described above for triggering the transmission of the offload indication may be further refined based on any of the conditions described herein.

For example, the triggering may further take into consideration the mobility state of the UE. For example, the WTRU transmits the offload indication if it determines that it is in a "low mobility state" and/or in a "medium mobility state". More specifically, if the UE determines an entering condition and if the UE is considered to be in a "low mobility" state, then an offload indication is triggered. Else if the UE is not in a low mobility state it doesn't transmit an offload indication. The determination of UE mobility state may be made based on using any well-known positioning technique, such as but not limited to GPS information, LTE positioning method, or any other positioning method. For example, the WTRU may determine its mobility state based on the velocity calculated through GPS measurements or via rate of change of GPS coordinates. The WTRU velocity may be compared with a predetermined threshold to determine whether the WTRU is in a low mobility state or high mobility state. The "low mobility state" may also be determined based on the rate of change of DL reference signals transmitted by one or multiple transmission points. The "low mobility state" may also be determined based on the rate of change of best cell event or handover rate. The "low mobility state" may also be determined based on the rate of change of a WTRU position calculated using the LTE positioning method (e.g. use of position reference symbols to determine WTRU position). The rate of change of WTRU position may be compared with a predetermined threshold to determine whether the WTRU is in a low mobility state or high mobility state.

The mobility state of the UE may be dependent on existing mobility state estimation procedures. The UE may then use the mobility state in combination with the determination of entering or leaving the offload area to trigger an offload indication. In one example, if the WTRU is in an offload area and has already triggered an indication and the mobility state changes to "high mobility state" the WTRU may trigger an offload indication, providing information that it is leaving the area or that it has changed mobility state.

The triggering may also take into account the traffic activity, such that the WTRU transmits the offload indication based on traffic activity, i.e. traffic heavy WTRUs may be candidates for offload to another cell. For example, the determination that a WTRU is a high traffic activity WTRU may be based on the DL and/or UL data rate transfers averaged over a certain period of time. The triggering may also take into account network indication and configuration, such that the WTRU transmits the offload indication if it is allowed to do so by the network, as indicated (or configured) by RRC configuration or in system information. The triggering may also be restricted by a restriction timer, which restricts the WTRU from triggering a new offload indication message unless a restriction time from the last "offload indication" has elapsed (e.g. the WTRU is restricted from transmitting a new offload indication for a configured period of time). An offload indication may be further triggered, if it has been triggered once (e.g. the UE is in an offload area) and handover to a new cell occurs (e.g. upon handover to a new cell a new offload indication is triggered to inform the new macro cell of the offload) . Alternatively, the WTRU may not need to resend the indication, but the source eNB forwards the information to the target eNB in the handover preparation (request) phase.

Control of inter-frequency measurements in idle mode is disclosed herein. The WTRU may initiate or stop inter-frequency or inter-RAT measurements in idle mode based on stored offline area information, according to at least one of the following methods. The WTRU may initiate inter-frequency or inter-RAT measurements on at least one frequency or RAT if at least the WTRU determines that it has entered an offload area where cells are deployed on this frequency or RAT. The determination that the WTRU has entered an offload area may be made by comparing its position to the stored offload area information or the offload area information that is provided by the RAN. The WTRU may stop inter-frequency or inter-RAT measurements on at least one frequency or RAT if the WTRU determines that it has left an offload area where cells are deployed on this frequency or RAT (and is not in any other offload area where cells are deployed on this frequency or RAT). The determination that the WTRU has left an offload area may be made by comparing its position to the stored offload area information or the offload area information that is provided by the RAN. In one example, when the WTRU determines it is in the vicinity of at least a small or offload cell, the WTRU may consider the frequency of the small cell as the highest priority frequency for cell reselection purposes.

The conditions described above for initiating or stopping inter-frequency or inter-RAT measurements may be further refined based on any of the examples provided herein. The WTRU may initiate inter-frequency or inter-RAT measurements if it determines that it is in a certain mobility state, for example "low mobility state" or in "medium mobility state". The determination of "low mobility state" may be based GPS information. For instance, the WTRU may determine its mobility state based on the velocity calculated through GPS measurements or via rate of change of GPS coordinates. The WTRU velocity may be compared with a predetermined threshold to determine whether the WTRU is in a low mobility state or high mobility state. Alternatively, the determination of "low mobility state" may be based on the rate of change of DL reference signals transmitted by one or multiple transmission points. Alternatively, the determination of "low mobility state" may be based on the rate of change of best cell event or handover rate. Alternatively, the determination of "low mobility state" may be based on the rate of change of WTRU position calculated using the LTE positioning method (e.g. used of PRS reference symbols to determine WTRU position). The rate of change of WTRU position may be compared with a predetermined threshold to determine whether the WTRU is in a low mobility state or high mobility state.

The mobility state of the UE may be dependent on existing mobility state estimation procedures. The UE may then use the mobility state in combination with the determination of entering or leaving the offload area to determine to start inter-frequency or inter-RAT measurements. In one example, if the WTRU is in an offload area and has already triggered an indication and the mobility state changes to "high mobility state" the WTRU may trigger an offload indication, providing information that it is leaving the area or that it has changed mobility state.

The WTRU may stop inter-frequency or inter-RAT measurements even if it has not left the offload area if it determines that it is no longer in a certain mobility state, for example "low mobility state" or "medium mobility state".

The WTRU may stop performing measurements if the WTRU has performed inter-frequency or inter-RAT measurements for a configured period of time and has not detected any valid candidate cells in the vicinity. This may also indicate that the offload area information stored in the WTRU may no longer be valid. Possibly, upon this determination the WTRU may remove the stored information.

Management of offload area information is described herein. The methods may be used to determine if the WTRU has the necessary offload area information stored for potential transmission of an offload indication message (in connected mode) or for initiation of inter-frequency measurements (in idle mode).

The WTRU may autonomously store the offload area information based on previously detected small cells, e.g. build a data base or fingerprint of small cells, their frequencies, location, etc.

Alternatively, the network may explicitly provide to the WTRU offload area information to assist the UE in finding and reporting the vicinity of small cells. Alternatively, the WTRU may use a combination of autonomous storing of information and based on information explicitly provided by the network to build the offload area information.

In one method, the WTRU may determine that it is lacking valid offload area information for at least one small cell or that it would like to request offload area information or that it would like to initiate acquisition of offload area information. Such a determination may be enabled using received information about the small cells (such as PCI, CGI, CSG ID, operating frequency) for which valid offload area information needs to be available, and detecting that such information is not available for at least one small cell. The WTRU may also determine that it is lacking valid offload area information for at least one small cell by receiving information about the macro cell (such as PCI, operating frequency) or by connecting to a macro cell for which a WTRU connected or camped to this macro cell needs to have valid offload area information. The WTRU may also determine that it is lacking valid offload area information for at least one small cell by receiving a value ("offload area tag") that identifies an offload area information at the network level and determining if it has stored offload area information associated with this identifier. The WTRU may also determine that it is lacking valid offload area information for at least one small cell by receiving a value ("offload area tag") that identifies an offload area information associated to a macro cell and comparing this value to a identifier that was stored by the WTRU when the offload area information was acquired for this macro cell.

The WTRU may determine it is lacking a valid offload area information if it is visiting the area for a first time and doesn't have anything stored for this area or for the connected cell (e.g. based on PCI, cell ID).

For example, an offload area tag may be associated to a certain macro cell and the set of small cells in its vicinity. Whenever the set of small cells is modified, or the offload area information associated to these cells is modified (due to a change in deployment), the network may change the offload area tag to a different value. This allows the WTRU to detect that its stored offload area information for the small cells in the vicinity of this macro cell is invalid if the stored offload area tag is different from the offload area tag provided by the network.

The WTRU may also determine that it is lacking valid offload area information or that it would like to request or acquire an offload area information for at least one small cell by determining that the speed of the WTRU is lower than a threshold which may be pre-defined or provided by higher layers. The WTRU may also determine that it is lacking valid offload area information or that it would like to request or acquire offload area information for at least one small cell by determining that a certain minimum time has elapsed since the last handover or cell reselection, where the minimum time may be pre-defined or provided by higher layers. The WTRU may also determine that it is lacking valid offload area information or that it would like to request or acquire offload area information for at least one small cell by determining that the WTRU is in a "low-mobility" state.

A WTRU moving above a certain speed through the macro layer may not be a good candidate for offloading to the small cell layer. In this case the WTRU may determine that no offload area information is required.

The WTRU may also determine that it is lacking valid offload area information for at least one small cell by determining that a certain minimum time has elapsed since the last handover or cell reselection, where the minimum time may be pre-defined or provided by higher layers. This is to prevent premature offloading to the small cell layer if the WTRU is moving rapidly. Alternatively, the WTRU may also determine that it is lacking valid offload area information or that it would like to request or acquire an offload area information or to update (e.g. modify, remove, add) the offload area information for at least one small cell by comparing the time at which the offload area information for at least one small cell was updated, and determining that this time is before a time limit determined by a maximum threshold. The maximum threshold (or time or duration limit) may be pre-defined or provided by the network. The WTRU may also determine that the offload area information is invalid if the time since the offload area was acquired exceeds the time limit.

The WTRU may determine that the existing offload area information is invalid upon a handover to a new macro cell. For example, if a handover to a macro cell takes place the WTRU may determine that the offload area information stored is no longer valid and may be removed. If a new offload area information is provided in the handover message or in the SIBs of the new cell the WTRU may store the new information. Alternatively, upon a handover the WTRU may keep the previous offload area information (until determined to be invalid based on other criteria above). If a new offload area information is received from the new macro cell or from a RRC reconfiguration message the WTRU may replace the store offload area information or alternatively store the new offload area information in addition to the already stored one.

In determining that the offload area information is invalid, not present or acquired, the information may be obtained by receiving information elements (IE's) in a reconfiguration message (such as a handover procedure to the macro cell) or from the SIB of the new macro cell the WTRU reselects to. For example, there may be a Boolean IE indicating whether there are small cells in the vicinity of the target macro cell for which offload area information needs to be stored. In another example, there may be IE's containing a list of small cells in the vicinity of the target macro cell for which offload area information needs to be stored or an IE containing the offload area information for the current UE location (e.g. current connected macro cell).

In determining that the offload area information is invalid, the information may be obtained by receiving information elements from system information broadcast from the macro cell. For instance, there may be a Boolean IE in a system information block indicating whether there are small cells in the vicinity of the macro cell for which offload area information needs to be stored.

The WTRU may verify whether it is lacking valid offload area information when at least one of the following events occurs: after cell reselection or handover to a cell (or macro cell); upon expiry of a timer started upon cell reselection or handover to a cell, where the value of the timer may be pre-defined or provided by higher layers; upon an explicit indication or request or configuration by the network; periodically, where the period may be pre-defined or provided by higher layers; or upon expiry of a timer started the last time the WTRU verified whether it is lacking valid offload area information.

The WTRU may always search and take measurements to determine proximity to small cell based on offload area information or fingerprint information on the small cells. The WTRU may autonomously determine when to start taking measurements according to the cell in which it is connected. For example the offload area information may be associated with a cell in the used frequency. The cell may be a cell on which the UE is connected to (serving cell or camped cell) and may be associated to a PCI, a list of neighboring PCIs, or CGI (cell identity) of the serving cell. When the UE determines that the PCI or CGI corresponds to a cell stored in its offload area then it may initiate measurement procedures to detect vicinity of the small cell area (e.g. GPS, PRS, other positioning method, or measurements on other frequencies).

Upon determining that it is lacking valid offload area information, the WTRU may initiate a procedure to acquire offload area information.

Methods for acquiring offload area information are described in herein. In idle mode, the WTRU may initiate inter-frequency measurements even if the signal strength and/or quality of the serving cell are above the thresholds (SintrasearchP, SintrasearchQ). Alternatively, the WTRU may perform inter-frequency measurements if the signal strength and/or quality of the serving cell are below new threshold values applicable to the case of lacking valid fingerprint information.

The WTRU may indicate to the network the capability and support of offload area and small cell detection.

WTRU may initiate a procedure to acquire offload area information by sending an indication to the network to notify that offload area information is missing. Upon reception of this indication, the network may configure the WTRU to perform inter-frequency measurements (in connected mode) or initiate a procedure to provide offload area information to the WTRU. The indication may be provided as part of a new or existing RRC procedure, or by MAC signaling (MAC control element). The indication may comprise a proximity indication or an offload indication. The indication may contain at least one of: information about cells for which associated offload area information is lacking, such as PCI, range of PCI's, CSG, CSG ID, cell identity (CGI), frequency, RAT, etc.; Offload area tag; or a cause indication to indicate that the reason for sending the indication is that the WTRU lacks valid offload area information.

The WTRU may also send an indication to the network to notify that it has stored offload area information, when at least one of the following events occur: after cell reselection or handover to a cell (or macro cell); upon expiry of a timer started upon cell reselection or handover to a cell, where the value of the timer may be pre-defined or provided by higher layers; upon an explicit indication or request by the network; periodically, where the period may be pre-defined or provided by higher layers; upon expiry of a timer started the last time the WTRU transmitted the indication to the network; or after acquisition of offload area information (e.g. using its own measurements).

The indication sent to the network may be provided as part of a new or existing RRC procedure, or by MAC signaling (MAC control element). The indication may comprise a proximity indication or an offload indication. The indication may contain at least one of: any information included as part of the offload area information as described in previous paragraphs; or a cause indication to indicate that the indication is providing offload area information.

To avoid storing offload area information indefinitely and to avoid having out-dated offload area information, the WTRU may clear and delete its stored information according to at least one of the following triggers: an validity timer expires for a given offload area information; the WTRU moves out of a cell (e.g. either due to cell reselection or due to a handover); the WTRU moves to idle mode; the WTRU performs an inter-frequency or inter-RAT handover; the WTRU moves out of a home PLMN; the WTRU changes PLMNs; the WTRU enters a roaming PLMN or a visiting PLMN (alternatively, the WTRU does not delete the offload area information of the home PLMN, but doesn't store any information for the roaming PLMN); the WTRU is explicitly told by the network to delete the offload area information; the WTRU changes RRC states; or the WTRU gets new offload area information (e.g. it deletes the previously stored information and stores the new one).

Acquisition of offload area information is described herein. The WTRU may apply the methods or procedures, for example, if it determines that the offload area information is not available or not valid according for instance to one of the methods described herein.

In one embodiment, the WTRU may acquire and store offload area information based on its own measurements. The measurements may include of any possible information contained or part of the offline area information. The acquisition and storage of offload area information may be performed if at least one or a combination of the following conditions is satisfied: the WTRU is camping or is connected to a cell which is associated to this offload area information; the cell is an open cell; the cell is a hybrid cell; the WTRU determines that it does not have valid offload area information associated to the cell, or the time elapsed since the last time the WTRU acquired offload information is higher than a threshold; the WTRU detects the presence of a cell which is associated to this offload area information, through e.g. synchronization signals (PSS/SSS); inter-frequency or inter-RAT measurements are configured in connected mode; the WTRU determines that it does not have valid offload area information associated to the cell; the WTRU is configured to perform positioning measurements based on e.g. GPS or positioning reference signals; or the WTRU received an indication from the network to perform the acquisition and storage of offload area information associated to this cell. In the last case, the indication may be provided in any RRC message such as the handover command for which the target cell is the small cell, or a re-establishment command, or in system information of the small cell. The indication may include information about cells for which associated offload area information may be acquired, such as PCI, range of PCI's, CSG, CSG ID, cell identity (CGI), frequency, RAT, etc.

In another embodiment, the WTRU may be provided with explicit offload area information by the network. The information provided by the network may include any information that may be part of offload area information as described in previous paragraphs (e.g. GPS coordinates, radius, cell identities, etc.). The network may provide this information in one or a combination of the following events: the WTRU enters the coverage of a macro cell (e.g. a handover takes place); the WTRU performs cell reselection to a macro cell (e.g. the macro cell may broadcast the system information); the network determines that no valid offload area information is available in the WTRU; upon explicit request by the WTRU to provide such information; at any point during operation. More specifically, such offload area information may be provided in at least one of the following ways: as part of a new information element inserted into an existing RRC message, such as at least one of: RRC connection reconfiguration (with or without mobilityControlInfo), received upon handover to a macro cell whose coverage area includes offload area(s); RRC connection re-establishment; RRC connection setup; RRC connection release (to provide fingerprint info in idle mode); system information (e.g. for idle mode); a new RRC message, or as part of a new RRC procedure.

The new RRC procedure may be initiated by the WTRU, upon determination that it lacks valid offload area information for at least one cell, as described in a previous section. This may avoid unnecessary signaling if the WTRU already has valid information. To enable initiation of such procedure by a WTRU in idle mode, the WTRU may initiate an RRC connection request with a new cause value.

The cell involved in the RRC signaling may be any cell, such as the macro cell whose coverage area includes at least one offload area, or a cell associated to an offload area.

An example realization of the methods described herein is illustrated below. More specifically, this example illustrates a method wherein the WTRU is explicitly provided an offload area information.

In this example, the WTRU enters a region or a macro cell. Upon handover, the macro cell provides the WTRU with offload area information of the region in which the small cells in the vicinity of the macro cell are located. For example, the offload area information may include a GPS coordinate and a radius over which the area extends with respect to the GPS coordinate. Alternatively, a number of GPS locations (e.g. 4) are provided to the WTRU and the offloading area may correspond to all the points located within these coordinates. Another example of location information that may be provided to the WTRU may be the PRS of a number of cells. If more than one offloading area information is available under the coverage of a macro cell, the WTRU may be provided more than one offloading area location information. The WTRU may also be provided with the frequency or RAT of the cell(s) within the signaled areas. The WTRU may acquire this information from the SIBs or the macro cell may provide to the WTRU via dedicated signaling.

Upon acquisition and/or storing of this information the WTRU may perform measurements to determine its location and to determine whether it has entered any of the stored offload areas. The WTRU may use the reception of this offloading area information to trigger and activate measurement procedures. For example, this may include activating GPS if not already active, or initiate PRS measurements. Alternatively, a message indicating that the UE should start measurement procedures to detect proximity/vicinity to an offload area (if already present in the WTRU) may be sent. This message may not include the offload are information. These measurements may be performed in the current operating frequency. When the WTRU determines that it has entered the configured offloading area according to any of the coordinates or location information it may trigger the offload indication. The indication may notify the network that the WTRU has entered the area. As an example, the WTRU may provide to the network its location such that the network may determine which offload area the WTRU is in the vicinity of. In another example, the WTRU just reports the frequency in which the offloading cells may be located. If more than one offload area information is provided to the WTRU, the WTRU may also report an index that indicates which area it has entered within the configured or stored location areas.

The WTRU may then be configured to start taking inter-frequency measurements or inter-RAT measurements. The decision for inter-frequency measurements may be based on the network or alternatively, for idle mode WTRUs the WTRU may autonomously decide to start taking measurements when it determines that it has entered the vicinity of such area.

In one example, when leaving the macro cell the WTRU may delete this location information and may start the same procedure if new coordinates are provided to the WTRU.

Methods of reporting positioning information to the network are described herein. Another method of allowing WTRU mobility from a macro cell to a small cell is to use positioning information from the WTRU to determine if it might be in the vicinity of small cells. This method may assist in self-organizing small cell deployments, and in cases when small cells are turned on and off dynamically to conserve energy. In this method, the WTRU may report its position to the network. The position and measurements may be taken on the used frequency. Using this information the network may determine when and whether to configure inter-frequency measurements for the WTRU. Once the positioning information is available, the serving eNB may use this to calculate the absolute distance between the WTRU and nearby small cell eNBs, and if the WTRU is determined to be within the vicinity, appropriate measurements may be initiated. The calculation of absolute distance is possible when the serving eNB has the location information of the small cell eNB also available. It may be assumed this information is available to the network, either as the small cells are network deployed, or in case of autonomous HeNB deployment, HeNBs transmit their positioning information to the network to ensure emergency call requirements are maintained.

WTRU based positioning methods are described herein. In case of WTRU-based positioning, the results of the measurements may be reported using at least one of the following means: by inserting the information into a measurement report triggered by any event as part of a LPP (LTE positioning protocol) message or alternatively it may be reported by including the positioning information in the offload indication or in the extended proximity report. In the case of WTRU-based positioning determination, an LPP session may need to be initiated to report the information to the eNB and the E-SMLC. Similar methods may also be applicable for GPS measurements.

In one embodiment, the LPP session is initiated by the eNB for candidate WTRUs for which it may like to receive positioning information. The determination of the candidate WTRUs, made by the eNB may be based on various factors including measurements, detected serving and neighbor cell-ids, OA&M (Operations Administration Maintenance) information, deployment vector map, etc.

In another embodiment, the WTRU may be configured to start/stop adding positioning information to the measurement report when it reaches configured thresholds added to the measConfig message. The request may be in the form of a one time request or in a form of a period measurement request for offloading information purposes.

In another embodiment, the WTRU may be configured to report positioning information when the WTRU detects it's moved within the proximity of pre-configured locations. For example, a new event may be created to initiate sending positioning reports to the network when the WTRU detects that it is within a radius of X meters within a location specified by co-ordinates $x_i, y_i \approx i, t_i$ (x, y, and z components of position, and the time sent). This event may be a new measurement event or a LPP event to trigger a measurement/LPP message report.

In another alternative, the small cell eNB (i.e. pico cell eNB or HeNB) operating on another frequency may send a reference signal or message on the same frequency as the serving eNB, so the WTRU operating in the serving eNB, and within the listening radius of the small cell, may use autonomous procedures to detect it. This may be reported to the network using an extension of an existing measurement event, the extended proximity indication or new offload indication report or a new LPP or measurement configuration event may be defined to initiate a report sent to the network. For example, in one alternative, the small cell eNB may send reference signals (e.g. the PRSs, CRS, of CSI-RS) or on neighboring frequencies (configured or detected), with a certain planned periodicity so there is no collisions between neighboring eNBs. The WTRU may be configured to detect all PRS symbols it hears from subframe 0 to subframe T, where T is the superset of PRS periodicity of all neighbors within a certain area. In one example, the network may configure the WTRU with the information and resources where the reference signals are transmitted). The WTRU then monitors the same frequency as the used frequency for this reference signals or PRS and when it detects them or when the quality of one or a subset of these reference signals is above a threshold then WTRU triggers an indication to the network.

To avoid reference symbol collision due to PCI confusion, the schedule and periodicity of transmitting the reference symbols may be managed centrally at the macro/network level or negotiated between the neighbors. The WTRU may be configured to send a report to the network if it detects any the reference signal within a configured window set.

Network based positioning methods are described herein. Separately from the location service support for particular WTRUs, an E-SMLC may interact with elements in the E-UTRAN to obtain measurement information to help assist one or more positioning methods for all WTRUs. In one alternative, the WTRU may be configured to autonomously initiate transmission of necessary positioning reference signals for uplink-based WTRU positioning measurements, so the eNB may estimate its position. This may be initiated by the WTRU based on finger-printing information.

The measurement configuration may include additional configuration thresholds that set rules on when the WTRU may initiate transmission of the positioning reference signals.

FIG. 2A shows an example method. At 200, the WTRU receives area offload information. At 202, the WTRU makes a coverage area determination that the WTRU may be within the coverage area of a small cell. At 204, the WTRU transmits an offload indication the network. In connected mode, the WTRU may transmit the offload indication over an established connection, while in the idle mode, the WTRU may first initiate an RRC connection prior to transmitting the offload indication. FIG. 2B shows an alternative example method. At 206, the WTRU receives area offload information from the network. At 208, the WTRU makes a coverage area determination that the WTRU may be within the coverage area of a small cell. At 210, the WTRU initiates inter-frequency and/or inter-RAT measurements. FIG. 2C shows a further alternative example method. At 212, the WTRU receives area offload information. At 214, the WTRU makes a coverage area determination that the WTRU may be within the coverage area of a small cell. At 216, the WTRU transmits an offload indication the network. At 218, the WTRU receives an inter-frequency or inter-RAT configuration message. At 220, the WTRU initiates the measurements according to the received configuration.

In one embodiment, the method comprises receiving offload area information at a Wireless Transmit-Receive Unit (WTRU) from a network; making a coverage area determination, based on the offload area information, of the WTRU with respect to a coverage area of a small cell; and, transmitting an offload indication to the network.

In an embodiment, the method includes offload area information that comprises any one or more of the following: (i) an area defined by a center point and a radius, (ii) a set of GPS coordinates, (iii) an area defined by a number of GPS coordinates, (iv) a coverage area of at least one macro cell and an identity of the at least one macro cell, (v) a list of Position Reference Symbols, (vi) one or more PCIs, (vii) one or more Cell Identities, (viii) a frequency at which a small cell operates, or, (ix) a radio access technology of a small cell.

In an embodiment, the method may include the offload area information being received via a Radio Resource Control (RRC) message, via a system information block, or via dedicated signaling.

In an embodiment, the method may include receiving the offload area information by the WTRU based on the occurrence of at least one of the following events: cell reselection; handover to a cell; expiry of a timer associated with cell reselection/handover to a cell; an explicit request by a network; expiry of a periodic timer.

In an embodiment, the method may include the coverage area determination being made by comparing a WTRU location with a reference location and a radius, or by comparing a WTRU location with a plurality of location reference points.

In an embodiment, the method may use an offload indication that includes one of: a WTRU location, a small cell ID, a small cell frequency, or an index value of a stored location.

In an embodiment, the method may further comprise receiving a small cell configuration from the base station in response to the offload indication.

In an embodiment, the method may include wherein the small cell configuration is an inter-frequency, inter-RAT or intra-frequency measurement configuration.

In an embodiment, the method may include wherein the offload indication indicates that the WTRU has entered a small cell coverage area, or that the WTRU has left a small cell coverage area.

In an embodiment, the method may include wherein transmitting the offload indication to the network is conditioned on a low mobility state of the WTRU.

In am embodiment, the method may include wherein the low mobility state is determined with respect to global positioning system (GPS) information.

In an embodiment, the method may include wherein transmitting the offload indication to the macro cell is conditioned on a traffic level of the WTRU.

In an embodiment, the method may include wherein the offload indication message comprises an RRC message.

In an embodiment, the method may include wherein the RRC message is a modified proximity indication message that includes information elements pertaining to offload.

In an embodiment, the method may include wherein the RRC message is an RRC Measurement Report message modified to include information elements indicating offloading.

In an embodiment, the method may include wherein the offload indication message includes at least one of the following information elements: an indication that the WTRU is entering the offload area; an indication that the WTRU is leaving the offload area; an identifier of the offload area to which the WTRU may be offloaded; a frequency on which the WTRU may be offloaded; a cell ID of a potential target cell to which the WTRU may be offloaded; a PCI of a potential target cell to which the WTRU may be offloaded; a radio access technology to which the WTRU may be offloaded; an area in which the WTRU is located.

In an embodiment, the method may further comprise verifying valid offload area information at the WTRU when at least one of the following events occurs: cell reselection; handover to a cell; expiry of a timer associated with cell reselection/handover to a cell; an explicit request by a network; expiry of a periodic timer; expiry of a timer started the last time the WTRU verified whether it is lacking valid offload area information.

In an embodiment, the method may include wherein the WTRU deletes stored offload area information based on any one the following triggers: an validity timer expires for a given offload area information; the WTRU moves out of a cell (e.g. either due to cell reselection or due to a handover); the WTRU moves to idle mode; the WTRU performs an inter-frequency or inter-RAT handover; the WTRU moves out of a home network; the WTRU changes public networks; the WTRU is explicitly told by a network to delete the offload area information; the WTRU changes RRC states; or, the WTRU gets new offload area information.

In an embodiment, one method may comprise: receiving offload area information at a wireless Transmit-Receive Unit (WTRU) from a macro cell base station; making a determination based on the offload area information that the WTRU is in a coverage area of a small cell; and, initiating inter-frequency and/or inter-RAT measurements to detect the small cell.

In an embodiment, the method may include wherein the offload area information comprises any one or more of the following: (i) an area defined by a center point and a radius, (ii) a set of GPS coordinates, (iii) an area defined by a number of GPS coordinates, (iv) a coverage area of at least one macro cell and an identity of the at least one macro cell, (v) a list of Position Reference Symbols, (vi) one or more PCIs, (vii) one or more Cell Identities, (viii) a frequency at which a small cell operates, or, (ix) a radio access technology of a small cell.

In an embodiment, the method may include the offload area information is received via a system information block.

In an embodiment, the method may include wherein the coverage area determination is made by comparing a WTRU location with a reference location and a radius, or by comparing a WTRU location with a plurality of location reference points.

In an embodiment, the method may include wherein initiating inter-frequency and/or inter-RAT measurements is conditioned on a low mobility state of the WTRU.

In an embodiment, the method may include wherein initiating inter-frequency and/or inter-RAT measurements is conditioned on a traffic level of the WTRU.

In an embodiment, the method may further comprise verifying valid offload area information at the WTRU when at least one of the following events occurs: cell reselection; handover to a cell; expiry of a timer associated with cell reselection/handover to a cell; an explicit request by a network; expiry of a periodic timer; expiry of a timer started the last time the WTRU verified whether it is lacking valid offload area information.

In an embodiment the method may comprise: receiving offload area information at a wireless Transmit-Receive Unit (WTRU) from a base station; making a determination based on the offload area information that the WTRU is in a coverage area of a small cell; transmitting an offload indication to a network entity; receiving an inter-frequency or inter-RAT measurement configuration; and, initiating inter-frequency and/or inter-RAT measurements according to the configuration.

In an embodiment, the method may include wherein the offload area information comprises any one or more of the following: (i) an area defined by a center point and a radius, (ii) a set of GPS coordinates, (iii) an area defined by a number of GPS coordinates, (iv) a coverage area of at least one macro cell and an identity of the at least one macro cell, (v) a list of Position Reference Symbols, (vi) one or more PCIs, (vii) one or more Cell Identities, (viii) a frequency at which a small cell operates, or, (ix) a radio access technology of a small cell.

In an embodiment, the method may include wherein the offload area information is received via a system information block.

In an embodiment, the method may include wherein the coverage area determination is made by comparing a WTRU location with a reference location and a radius, or by comparing a WTRU location with a plurality of location reference points.

In an embodiment, an embodiment may include an apparatus comprising a Wireless Transmit Receive Unit (WTRU) configured to receive offload area information from a macro cell base station; make a coverage area determination, based on the offload area information, of the WTRU with respect to a coverage area of a small cell; and, transmit an offload indication to the macro cell.

In an embodiment, the apparatus may include the WTRU configured to make the coverage area determination by comparing a WTRU location with a reference location and a radius, or by comparing a WTRU location with a plurality of location reference points.

In an embodiment, the apparatus may be further configured to receive a small cell configuration from the base station in response to the offload indication.

In an embodiment, the apparatus is further configured to transmit the offload indication to the macro cell based on a low mobility state of the WTRU.

In an embodiment, the apparatus is further configured to transmit the offload indication to the macro cell based on a traffic level of the WTRU.

In an embodiment, the apparatus further configured to verify valid offload area information when at least one of the following events occurs: cell reselection; handover to a cell; expiry of a timer associated with cell reselection/handover to a cell; an explicit request by a network; expiry of a periodic timer; expiry of a timer started the last time the WTRU verified whether it is lacking valid offload area information.

In an embodiment, the apparatus is further configured to delete stored offload area information based on any one the following triggers: a validity timer expires for a given offload area information; the WTRU moves out of a cell (e.g. either due to cell reselection or due to a handover); the WTRU moves to idle mode; the WTRU performs an inter-frequency or inter-RAT handover; the WTRU moves out of a home network; the WTRU changes public networks; the WTRU is explicitly told by a network to delete the offload area information; the WTRU changes RRC states; or, the WTRU gets new offload area information.

In an embodiment, an apparatus or system may be configured to perform any of the methods described herein.

In an embodiment, a base station or evolved NodeB may be configured to perform any of the methods described herein.

In an embodiment, a tangible computer readable storage medium having stored thereon computer executable instructions for performing any of the above methods.

Variations of the method, apparatus and system described above are possible without departing from the scope of the invention. In view of the wide variety of embodiments that can be applied, it should be understood that the illustrated embodiments are exemplary only, and should not be taken as limiting the scope of the following claims. For instance, in the exemplary embodiments described herein include handheld devices, which may include or be utilized with any appropriate voltage source, such as a battery and the like, providing any appropriate voltage.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

No element, act, or instruction used in the description of the present application should be construed as critical or essential to the invention unless explicitly described as such. Also, as used herein, each of the articles "a" and "an" are intended to include one or more items. Where only one item is intended, the terms "a single" or similar language is used. Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method comprising:
receiving offload area information at a Wireless Transmit-Receive Unit (WTRU) from a network, the offload area information disclosing a location of a small cell;
making a coverage area determination, based on the offload area information, of whether the WTRU may be within a coverage area of a small cell; and,
responsive to the coverage area determination meeting a condition and a mobility state of the WTRU being lower than a threshold, transmitting an offload indication to the network indicating that the WTRU is a candidate for offload to the small cell.

2. The method of claim 1 wherein the offload area information comprises any one or more of the following: (i) a frequency at which a small cell operates, or, (ii) a radio access technology of a small cell.

3. The method of claim 1 wherein the offload area information is received via a Radio Resource Control (RRC) message.

4. The method of claim 1 wherein the offload area information is received via a system information block.

5. The method of claim 1 wherein the offload area information is received by the WTRU based on expiry of a timer associated with cell reselection/handover to a cell.

6. The method of claim 1 wherein the coverage area determination is made by comparing a WTRU location with a reference location and a radius, or by comparing a WTRU location with a plurality of location reference points.

7. The method of claim 1 wherein the offload indication includes one of: a WTRU location, a small cell ID, a small cell frequency, or an index corresponding to an offload area.

8. The method of claim 1 further comprising receiving a small cell configuration from the base station in response to the offload indication.

9. The method of claim 8 wherein the small cell configuration is an inter-frequency, inter-RAT or intra-frequency measurement configuration.

10. The method of claim 1 wherein transmitting the offload indication to the network is conditioned on a traffic level of the WTRU.

11. An apparatus comprising a Wireless Transmit Receive Unit (WTRU) configured to receive offload area information disclosing a location of a small cell from a macro cell base station; make a coverage area determination, based on the offload area information, of whether the WTRU may be within a coverage area of a small cell; and, responsive to the coverage area determination meeting a criterion and a mobility state of the WTRU being lower than a threshold, transmit an offload indication to the macro cell indicating that the WTRU is a candidate for offload to the small cell.

12. The apparatus of claim 11 wherein the WTRU is configured to make the coverage area determination by comparing a WTRU location with a reference location and a radius, or by comparing a WTRU location with a plurality of location reference points.

13. The apparatus of claim 11 wherein the WTRU is further configured to receive a small cell configuration from the base station in response to the offload indication.

14. The apparatus of claim 11 wherein the WTRU is further configured to transmit the offload indication to the macro cell based on a traffic level of the WTRU.

15. The apparatus of claim 11 wherein the WTRU is further configured to verify whether the WTRU is lacking valid offload area information when at least one of the following events occurs: expiry of a timer associated with cell reselection/handover to a cell; expiry of a periodic timer; and expiry of a timer started the last time the WTRU verified whether it is lacking valid offload area information.

16. The apparatus of claim 11 wherein the WTRU is further configured to delete stored offload area information based on any one of the following triggers:
   a validity timer expires for a given offload area information;
   the WTRU moves out of a cell;
   the WTRU moves to idle mode;
   the WTRU performs an inter-frequency or inter-RAT handover;
   the WTRU moves out of a home network;
   the WTRU changes public networks;
   the WTRU is explicitly told by a network to delete the offload area information;
   the WTRU changes RRC states; and
   the WTRU gets new offload area information.

17. The apparatus of claim 11 wherein the offload indication indicates that the WTRU has entered a small cell coverage area, or that the WTRU has left a small cell coverage area.

18. A method comprising:
   receiving offload area information disclosing an area covered by a small cell at a wireless Transmit-Receive Unit (WTRU) from a macro cell base station;
   making a determination based on the offload area information that the WTRU is in a coverage area of a small cell; and
   responsive to a determination that the WTRU is in a coverage area of a small cell, initiating inter-frequency and/or inter-RAT measurements to detect the small cell.

19. The method of claim 18 wherein initiating inter-frequency and/or inter-RAT measurements is conditioned on a mobility state of the WTRU.

20. The method of claim 18 wherein initiating inter-frequency and/or inter-RAT measurements is conditioned on a traffic level of the WTRU.

21. A method comprising:
   receiving offload area information disclosing an area covered by a small cell at a wireless Transmit-Receive Unit (WTRU) from a base station;
   making a determination based on the offload area information that the WTRU is in a coverage area of a small cell; and
   responsive to a determination that the WTRU is in a coverage area of a small cell:
      transmitting an offload indication to a network entity;
      receiving an inter-frequency or inter-RAT measurement configuration; and
      initiating inter-frequency and/or inter-RAT measurements according to the configuration.

* * * * *